(12) United States Patent
Kangasundram et al.

(10) Patent No.: US 7,284,702 B2
(45) Date of Patent: Oct. 23, 2007

(54) ADAPTER FOR DIGITAL MEDIA READER

(75) Inventors: Siva Balan A. Kangasundram, Singapore (SG); Ah Leen Neo, Singapore (SG); John Pisarczyk, Bridgeport, CT (US)

(73) Assignee: SCM Microsystems (U.S.) Inc., Fremont, CA (US)

( * ) Notice: Subject to any disclaimer, the term of this patent is extended or adjusted under 35 U.S.C. 154(b) by 348 days.

(21) Appl. No.: 11/076,628

(22) Filed: Mar. 10, 2005

(65) Prior Publication Data

US 2005/0199718 A1 Sep. 15, 2005

Related U.S. Application Data

(60) Provisional application No. 60/552,579, filed on Mar. 12, 2004.

(51) Int. Cl.
*G06K 7/06* (2006.01)
*G06K 7/00* (2006.01)
(52) U.S. Cl. ...................... 235/441; 235/486
(58) Field of Classification Search .......... 235/441, 235/486, 487, 492
See application file for complete search history.

(56) References Cited

U.S. PATENT DOCUMENTS

| | | | | |
|---|---|---|---|---|
| 5,483,422 A | * | 1/1996 | Bowen et al. | 361/802 |
| 6,457,647 B1 | * | 10/2002 | Kurihashi et al. | 235/486 |
| 2003/0111541 A1 | * | 6/2003 | Washino et al. | 235/492 |
| 2004/0041024 A1 | * | 3/2004 | Liu et al. | 235/441 |

* cited by examiner

*Primary Examiner*—Thien M. Le
*Assistant Examiner*—April Taylor
(74) *Attorney, Agent, or Firm*—Stuart J. Friedman

(57) ABSTRACT

An adapter for removable insertion into a digital media slot, having the same interface as the adapter, formed in a front panel of a digital media reader, the adapter removably receiving digital media therein instead of directly into the reader, includes a generally rectangular header having a first face defining a plurality of female apertures in a configuration corresponding to the configuration of the reader's male connector pins and a second face having a plurality of projecting male connector pins in the same configuration as the reader's male connector pins, guide means corresponding to the reader's guide structure defining the sides of the header for slidably engaging the guide structure of the reader and a metal plate on the header for discharging electrostatic charge when the adapter is inserted into the reader, the adapter being positioned behind the front panel of the reader when fully inserted into the slot.

12 Claims, 7 Drawing Sheets

ADAPTER FOR DIGITAL MEDIA READER

CROSS-REFERENCE TO RELATED APPLICATIONS

This is a non-provisional application based upon U.S. provisional application Ser. No. 60/552,579, filed Mar. 12, 2004, now pending.

FIELD OF THE INVENTION

The present invention relates to an adapter for digital media readers and writers and, more particularly, to an adapter for digital media readers available in public areas, such as self-service kiosks.

BACKGROUND OF THE INVENTION

Self-service kiosks are well known for viewing personal photos, e-mailing personal photos, photo printing, photo editing, and the like. Perhaps most popular are self-service imaging kiosks which allow users to obtain photographic prints from digital media, to edit and customize their prints. Digital media readers in the kiosks allow users to download pictures from virtually any digital camera or flash media card. Such a kiosk typically includes a housing constructed of a durable material that will be able to withstand extended use and a variety of environmental conditions in which the reader and other digital imaging equipment is located. Typically, the readers are able to read digital media of multiple formats and include a plurality of standard slots for receiving such digital media, such as Type III PC cards, CompactFlash, SmartMedia, MultiMedia Card, Secure Digital and Memory Stick.

For many of these media, particularly CompactFlash, the reader's internal connector is frequently damaged due to the very frequent insertion and unplugging of the user's digital media or due to misuse, such as inserting the wrong digital media in a reader slot. The maintenance of such readers is expensive and time consuming because it requires the intervention of trained technicians that have to repair and reinstall the reader in the enclosure.

The problem of damaged digital media slots in kiosk-based readers has become a serious and expensive problem for operators and owners of self-service imaging kiosks and a simple, inexpensive and rapidly implemented solution is sorely needed.

SUMMARY OF THE INVENTION

It is, therefore, a primary object of the present invention to provide an adapter having the same interface as the reader slot as an intermediate part between the reader slot and the user digital media, wherein the adapter can be easily extracted and replaced without intervention by a highly trained technician.

It is also an object of the present invention to provide an adapter for digital media readers which is relatively inexpensive to replace, as contrasted with repair of digital media reader's guide structure and reinstallation by highly trained technicians.

It is another object of the present invention to provide an adapter for digital media readers which cannot easily be removed by a user and is, thus, secure against theft or vandalism.

The foregoing and other objects are achieved in accordance with the present invention by providing an adapter for removable insertion into a digital media slot, having the same interface as the adapter, formed in a front panel of a digital media reader, said slot communicating with a guide structure for guiding insertion of said digital media therein and a plurality of male connector pins on said guide structure for electrical connection with a plurality of corresponding female connectors on said digital media, said adapter being positioned within said slot for removably receiving digital media into said adapter instead of directly into said slot and guide structure of said digital media reader, comprising:

(a) a generally rectangular header having an elongate top and bottom, opposite first and second elongate faces and opposite sides, said first face defining a plurality of electrical connector female apertures arranged in a configuration corresponding to the configuration of the male connector pins of said digital media reader for receiving the reader male connector pins in electrical contact therewithin, said second face having a plurality of male connector pins projecting therefrom in the same configuration as the reader male connector pins for electrical connection with said plurality of corresponding female connectors on said digital media;

(b) guide means corresponding to the guide structure of said reader defining the sides of said header, said guide means slidably engaging the guide structure of said reader for assuring proper sliding fit of said adapter within said guide structure and proper registry of said reader's male connector pins with said header's female apertures; and (c) means on said header for contacting structure on said reader for discharging electrostatic charge when said adapter is inserted into said reader;

whereby said adapter is positioned behind said front panel of said reader when fully inserted into said slot.

In another aspect of the invention, there is provided an adapter for digital media readers including a metal plate extending from the bottom of the header toward and forward of the male connector pins on the header, the metal plate having an aperture therein adjacent its forward end, its forward end being positioned immediately adjacent and rearward of the front panel of the reader when the adapter is fully inserted through the slot into the reader, whereby an adapter removal tool can be inserted through the slot into releasable engagement with the aperture for lifting the adapter above the bottom lip of the slot and extracting the adapter through the slot.

In still another aspect of the invention, said header includes ribs and grooves along its sides extending between its first and second faces, said ribs and grooves slidably engaging corresponding ribs and grooves on the guide structure of said reader.

DESCRIPTION OF THE PREFERRED EMBODIMENT

The adapter of the present invention is described herein as an adapter for a CompactFlash digital media for use in a host which is a self service imaging kiosk, for example, for photo printing. It will be appreciated, however, that the adapter of the present invention is intended to be an interface between any type of user digital media and any type of digital reader or writer, or both, connected to any type of host.

The adapter of the present invention is intended to take the abuse and sustain the damage that frequently occurs within the digital media slots of a reader/writer. This damage occurs as a consequence of frequent usage of the reader/writer or negligent usage by inadequately informed users who may, for example, attempt to force the wrong digital media into the slot. When an adapter is used, the adapter connectors will be broken instead of the reader/writer connectors. Because the adapter of the present invention can be easily inserted and removed from the reader/writer, it is a relatively simple task for a host owner or renter, who is not a highly trained technician, to remove a broken adapter and replace it with another adapter in a matter of a few minutes. In a preferred embodiment, the adapter includes structure which makes it very difficult for kiosk users who do not understand the structure to remove the adapter from the digital media slot in the reader. This is because the adapter is not easily gripped from the outside of the reader/writer. However, for those who understand the structure, use of a simple tool can aid in removing the adapter.

Figure 1:
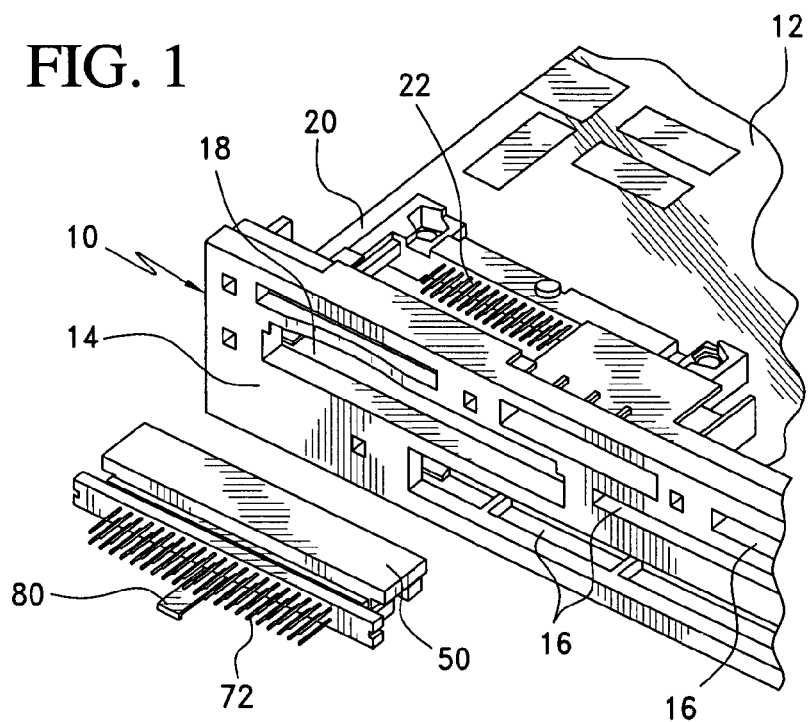
FIG. 1 is a front perspective view of a multiple slot digital media reader and the adapter of the present invention.
Figure 2:
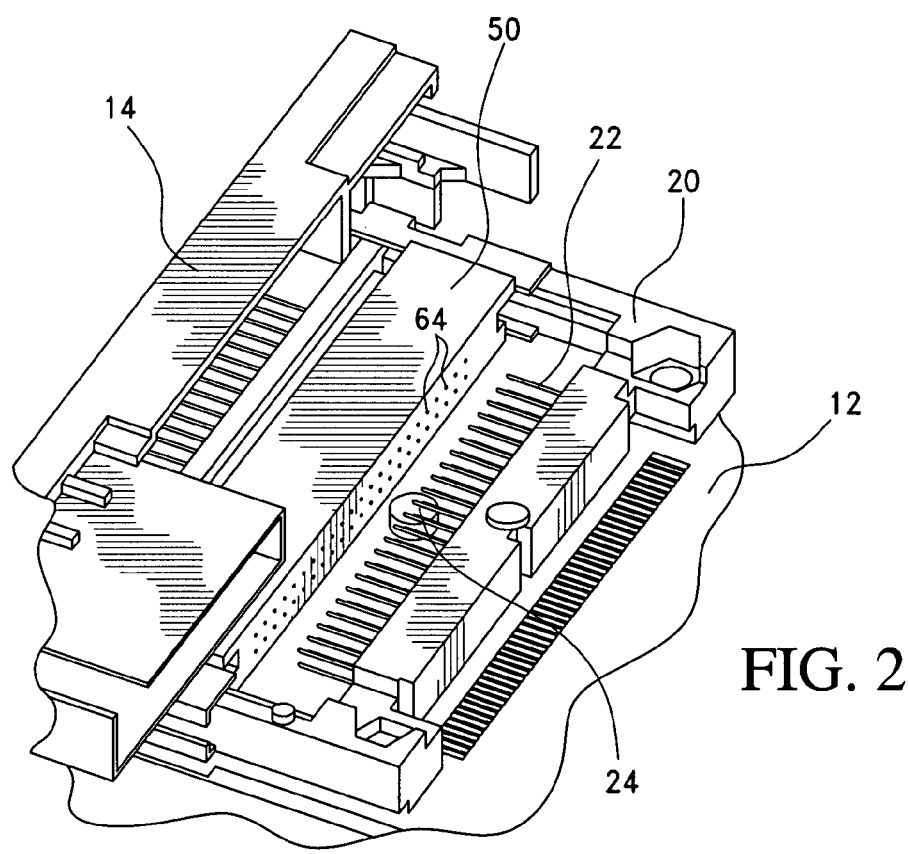
FIG. 2 is a rear perspective view of the multiple slot digital media reader with the adapter of the present invention partially plugged therein.
Figure 3:
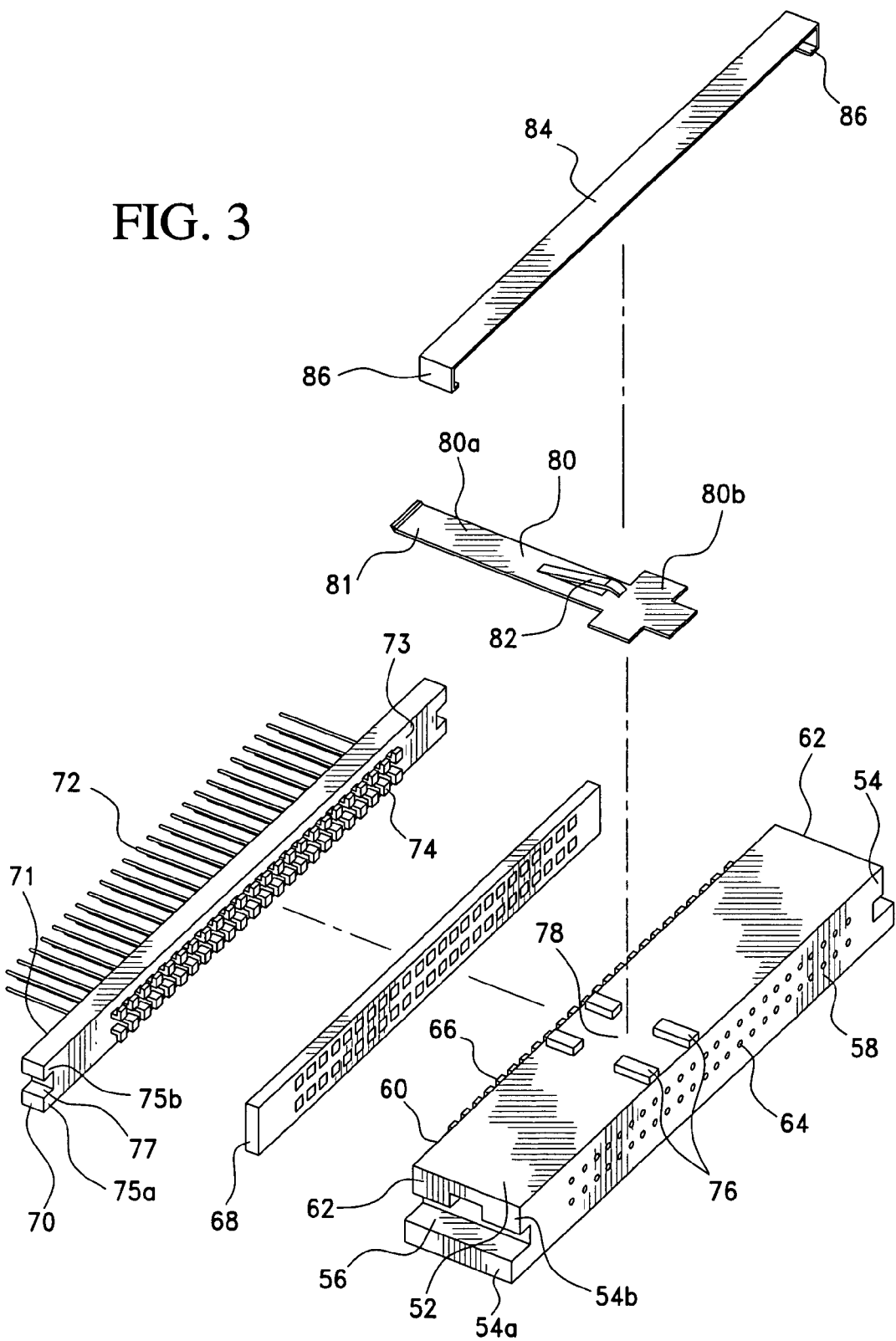
FIG. 3 is an exploded perspective view of the adapter of the present invention viewed from its underside.
Figure 4:
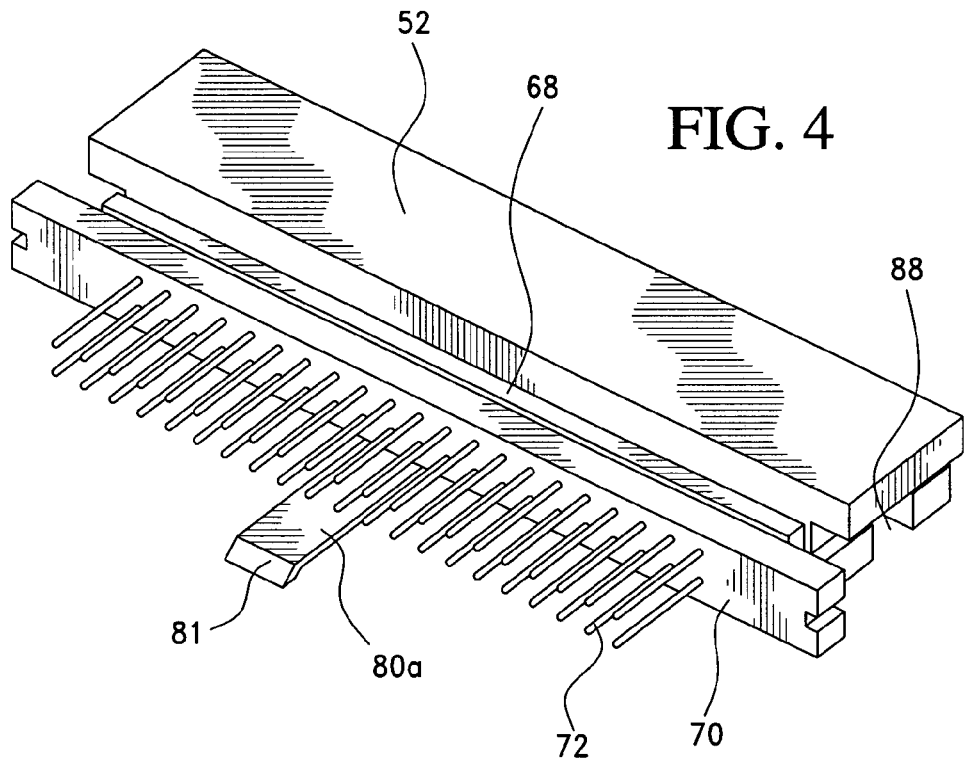
FIG. 4 is a perspective view of the adapter of the present invention viewed from its upper side.

Referring first to FIGS. 1 and 2, multiple slot digital media reader 10 includes a printed circuit board 12 and a front panel 14 in which is defined a number of slots 16 for digital media and guide structure for each slot. A typical slot 18, for example for CompactFlash digital media, includes guide structure 20 fixed on the printed circuit board 12 to guide the insertion of digital media into electrical contact with a series of male connector pins 22 at the rear of the guide structure 20. The user who intends to use the kiosk's self services inserts his digital media into the slot 16 appropriate for his digital media. The adapter 50 of the present invention is intended for insertion into a slot 16 having the same interface as the adapter and is inserted therein and plugged into male connector pins 22 prior to the user inserting his digital media into the slot. As a result, the male connector pins 22 of the guide structure 20 are protected against the risk of broken parts because of frequent insertion/removal of digital media or the misuse of digital media. Instead of damaging the male connector pins 22, the corresponding male connector pins of the adapter 50 may be broken. Since the adapter 50 can be readily replaced, use of an adapter 50 obviates the need for a highly trained technician to travel to the kiosk to replace the broken part.

FIG. 1 shows adapter 50, in the form of an adapter to receive CompactFlash digital media, ready to be inserted into CompactFlash slot 18 in the front panel 14 of multiple slot digital media reader 10. FIG. 2 is a rear view of the multiple slot digital media reader 10 and shows adapter 50 partially inserted into slot 18 and about to be plugged into male connector pins 22 of reader 10. As the adapter 50 is inserted, a printed circuit board screw 24 contacts the cantilever arm 82 of a metal plate 80 on the adapter 50 in order to discharge any electrostatic charge. Corresponding ribs and grooves on guide structure 20 and the sides of adapter 50 interengage to assure proper fit of the adapter 50 within guide structure 20, assure easy sliding insertion and assure that male connector pins 22 align with and plug into corresponding female connector receptacles 64 on adapter 50.

Referring to FIGS. 3-7, adapter 50 includes an elongate header 52 which has upper and lower ribs 54*a,b* and grooves 56 therebetween extending from its leading face 58 (oriented as it is inserted into slot 18) to its rear face 60 along both of its sides 62. The ribs 54 and grooves 56 slidingly interengage with corresponding ribs and grooves on guide structure 20, as hereinbefore discussed. Leading face 58 includes the female connector receptacles 64 which plug into male connector pins 22. Rear face 60 includes a series of header pins 66 which are soldered to soldering adapter 68. Receptacle 70 is an elongate mount for male connector pins 72 extending from rear face 71 thereof, which fit inside the female connectors of the user's digital media, Projecting from the opposite face 73 of receptacle 70 are a series of receptacle pins 74 which are soldered to adapter 68 in order to electrically link male connector pins 72 of receptacle 70 to female connectors 64 of header 52. As can be seen, soldering adapter 68 functions as an intermediate soldering piece to solder header pins 66 to receptacle pins 74 and, for that purpose, includes solder pads on both sides thereof. In another embodiment, adapter 68 could be omitted and header pins 66 could be soldered directly to receptacle pins 74. In still another embodiment, header 52 and receptacle 70 could be a unitary part. Receptacle 70 includes upper and lower ribs 75*a,b* and grooves 77 therebetween extending from its face 73 to its rear face 71, which correspond with the ribs 54 and grooves 56 of header 52.

Figure 5:
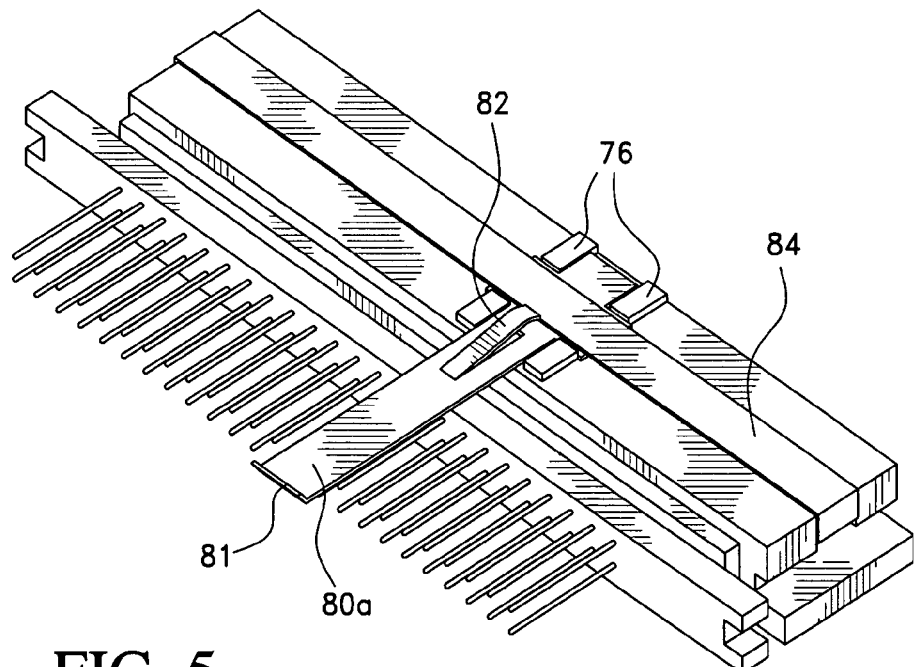
FIG. 5 is a perspective view of the adapter of the present invention viewed from its underside.
Figure 6:
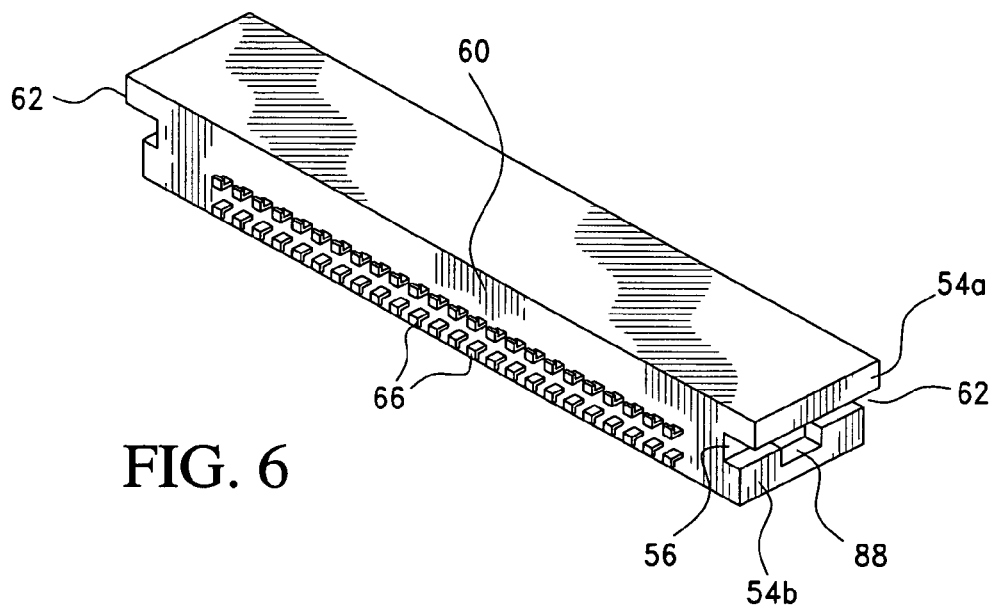
FIG. 6 is a perspective view of the header of the adapter of the present invention viewed from its upper side.
Figure 7:
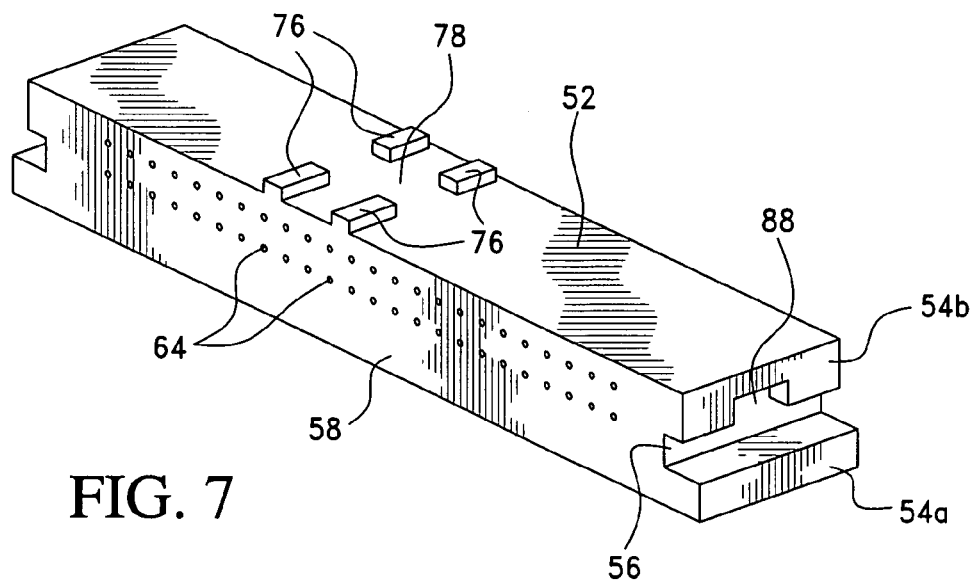
FIG. 7 is a perspective view of the header of the adapter of the present invention viewed from its underside.

As can be seen in FIG. 7, header 52, on its underside, includes a series of projections 76 which define an area 78 for mounting metal plate 80. In a preferred embodiment, plate 80 is configured in a Latin cross shape, with the intersection between the lengthwise member 80*a* and the crosspiece 80*b* seating in area 78 between projections 76 with the crosspiece 80*b* extending longitudinally of header 52 and the lengthwise member 80*a* projecting toward and beyond male connector pins 72 of receptacle 70, as can be seen in FIG. 5. A downward chamfer 81 at the front end of lengthwise member 80*a* facilitates installation of the adapter 50 into slot 18 and permits the front end of member 80*a* to seat behind the front panel 14 of reader 10, so that no part of adapter 50 protrudes from slot 18 and adapter 50 is not easily gripped from outside reader 10. A cantilevered arm 82 projects from the bottom of lengthwise member 80*a* to contact screw 24 as adapter 50 is inserted through slot 18 onto guide structure 20. A stainless steel band 84 having wrap around end portions 86 secures plate 80 to the underside of header 52, with the wrap around ends 86 engaged in notches 88 formed in lower rib 54*b* of header 52. In another embodiment, metal plate 80 and header 52 may be so configured that the plate 80 is mounted to header 52 without need for stainless steel band 84.

Figure 8:
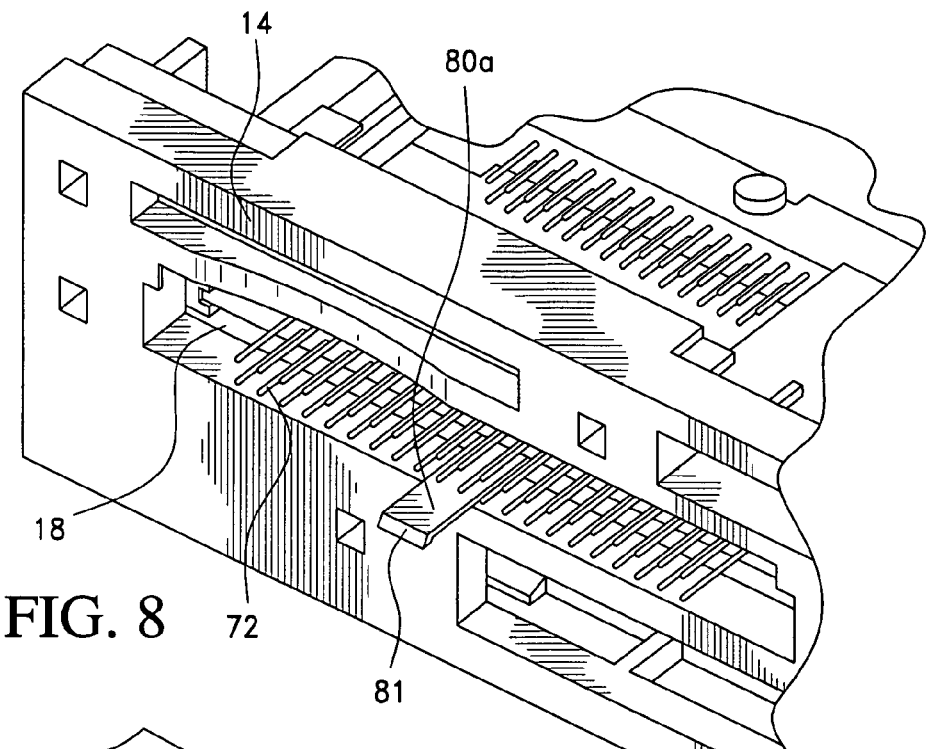
FIG. 8 is a front perspective view of the adapter of the present invention partially inserted into the multiple slot digital media reader.
Figure 9:
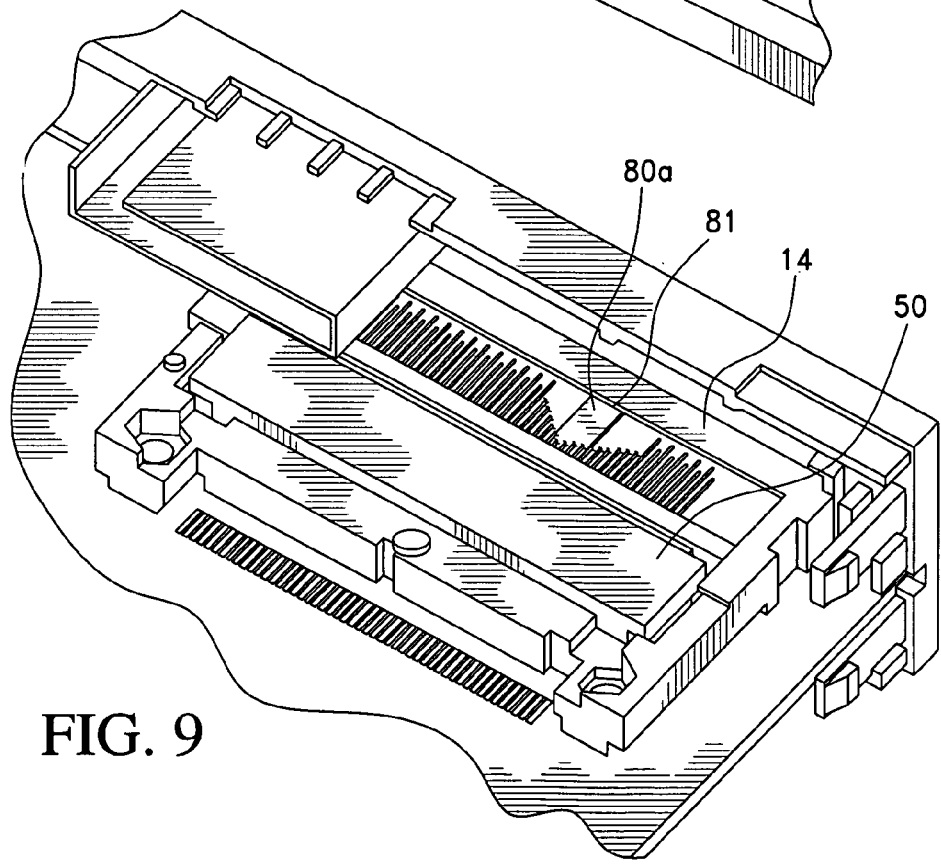
FIG. 9 is a top perspective view of the adapter of the present invention fully inserted into the multiple slot digital media reader.
Figure 11:
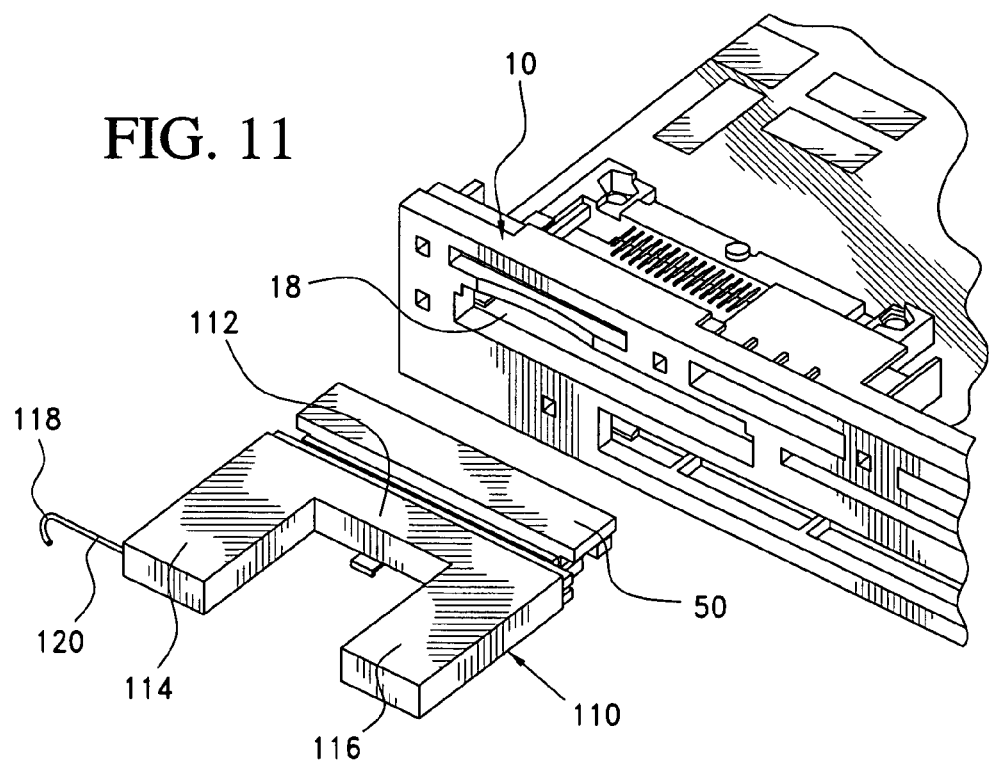
FIG. 11 is a front perspective view showing an insertion/extraction tool assisting insertion/extraction of the adapter of the present invention into/from the multiple slot digital media reader.
Figure 12:
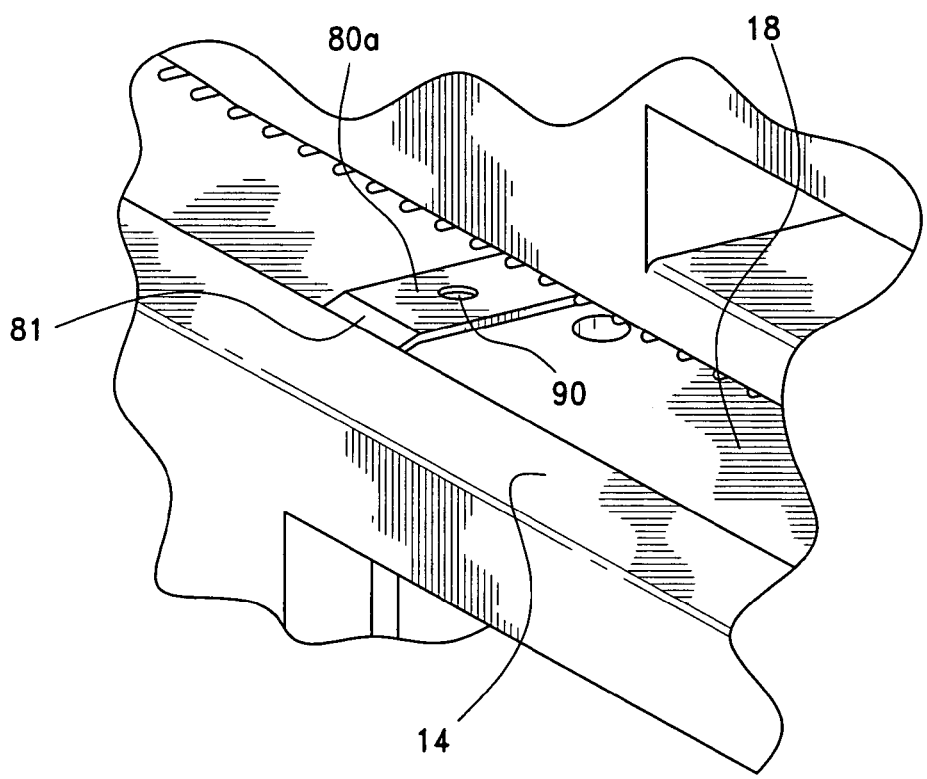
FIG. 12 is a partial front perspective view of a digital media slot in a multiple slot digital media reader with the adapter of the present invention fully inserted therein.

As can be seen from FIGS. 8, 9 and 12, the front end portion of lengthwise member 80*a* may be used for easy insertion of adapter 50 inside reader 10. FIG. 8 shows adapter 50 partially inserted into slot 18 with only male connector pins 72 and the front end portion of lengthwise member 80*a* projecting out of slot 18. As the adapter is fully inserted, lengthwise member 80*a* deflects slightly, which allows the chamfered end 81 to slide across the width of front panel 14 at slot 18 and tuck behind front panel 14. When fully inserted, no part of adapter 50 projects outside of reader 10 and therefore adapter 50 cannot be easily gripped from outside reader 10. Therefore, only those who have knowledge of the configuration of adapter 50 and how it fits into slot 18 will know how to remove it. In fact, removal is quite simple. For example, insertion of a small tool into slot 18 into an aperture in the front end portion of lengthwise member 80*a* and use of the tool as a lever, allows the chamfer end of lengthwise member 80*a* to be raised to a level higher than the bottom lip of slot 18, whereupon adapter 50 can be removed from reader 10. FIG. 9 is a top view of reader 10 showing adapter 50 fully inserted therein with chamfer 81 of lengthwise member 80*a* tucked behind front panel 14 below the bottom of slot 18. FIG. 12 is a front view through slot 18 showing the chamfered end in place behind front panel 14. FIG. 12 also shows an aperture 90 formed in the end of lengthwise member 80*a* near chamfer 81 for receiving a hook 118 of a special tool 120 (see FIG. 11) designed for extracting adapter 50 from reader 10.

Figure 10:
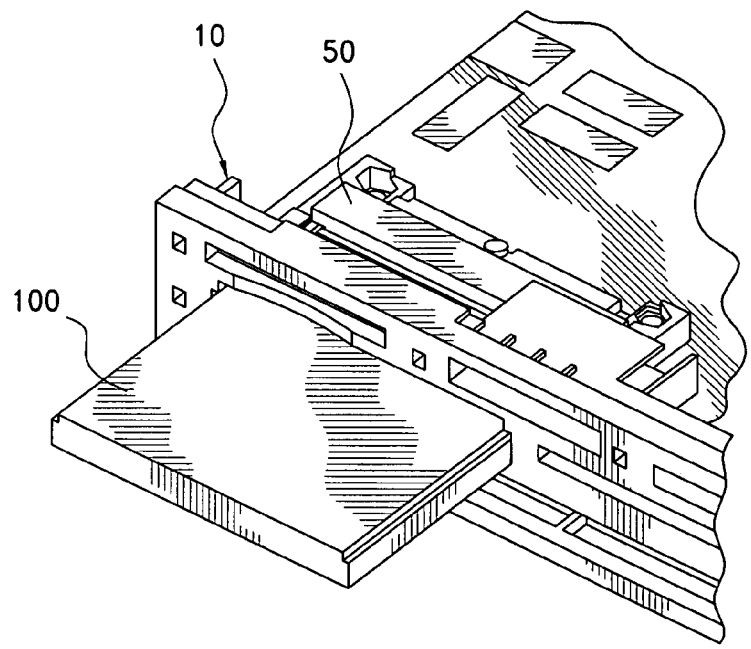
FIG. 10 is a top perspective view of the multiple slot digital media reader with the adapter of the present invention inserted and with a digital media partially inserted in the adapter.

FIG. 10 shows reader 10 with adapter 50 installed and a user digital media, in this case a CompactFlash 100, being inserted into adapter 50 within reader 10.

FIG. 11 shows an insertion/extraction tool 110 having a generally U-shape for inserting adapter 50 into slot 18 of reader 10. The tool has an adapter connector at the base 112 of the U-shape to mate with adapter 50 and includes legs 114, 116 to apply a balanced insertion force to opposite ends of adapter 50. In lieu of legs 114, 116, tool 110 may also be generally rectangular to achieve substantially the same result. In one embodiment, a separate adapter removal tool 120 may be removably affixed to insertion/extraction tool 110 for convenience. In another embodiment, an adapter extraction tool having a downwardly projecting hook may be a part of insertion/extraction tool 110 and positioned at the opposite edge of tool 110 from base 112 (in this embodiment, a generally rectangular tool 110 is preferred). With insertion/extraction tool 110 rotated 180° from its insertion position, the downwardly projecting hook of the adapter removal tool engages aperture 90 within slot 18 to mate the tool with the adapter. With the hook of adapter insertion/extraction tool engaged with aperture 90 of adapter 50, the insertion/extraction tool can be used to extract the adapter 50 from slot 18 by lifting upwards to allow the bottom of adapter 50 to clear the bottom lip of slot 18 while the top of adapter 50 is below or touching the upper lip of slot 18, and then extracting adapter 50 from slot 18.

Figure 13:
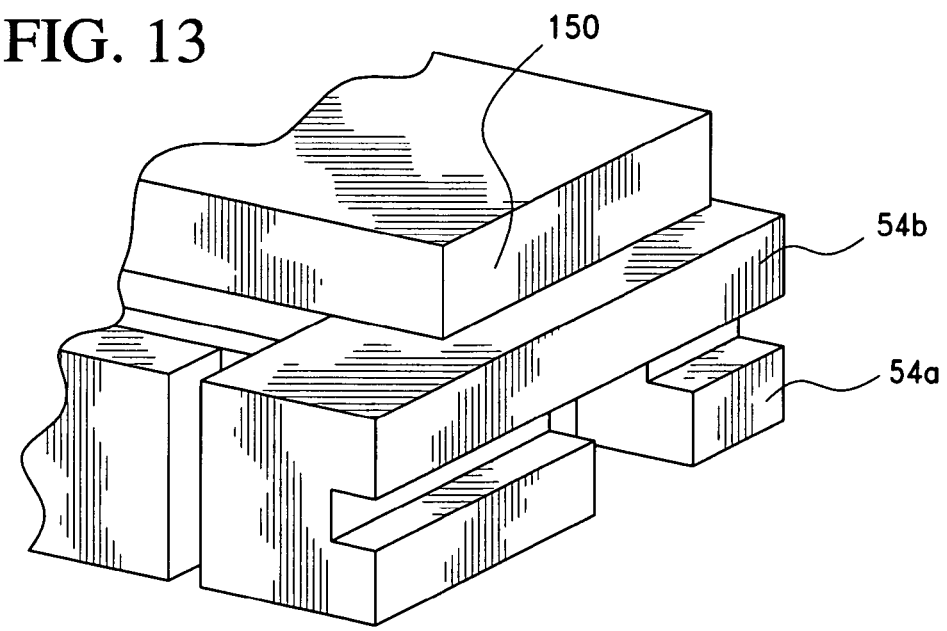
FIG. 13 is a perspective view of an alternative embodiment of a header for the adapter of the present invention.

In another embodiment of the invention, shown in FIG. 13, in order to reduce still further the risk of damaging the reader connector pins 22, header 52 may include an additional rib 150 positioned below rib 54*b* along the sides of header 52. In order to implement use of this additional guidance means, the guide structure 20 of reader 10 must correspondingly be adapted.

The header 52 and receptacle 70 are formed of insulating materials, typically polymeric materials, which seat within reader 10 on guide structure 20 which is also formed of an insulating polymeric material. In a preferred embodiment, header 52 is formed of a high temperature thermoplastic material and receptacle 70 is formed of a polycarbonate material. The metal plate 80 is formed of stainless steel and, desirably, has a thickness of about 0.2 mm.

While the present invention has been described in terms of specific embodiments thereof, it will be understood that no limitations are intended to the details of construction or design other than as defined in the appended claims.

The invention claimed is:

1. An adapter for removable insertion into a digital media slot, having the same interface as the adapter, formed in a front panel of a digital media reader, said slot communicating with a guide structure for guiding insertion of said digital media therein and a plurality of male connector pins on said guide structure for electrical connection with a plurality of corresponding female connectors on said digital media, said adapter being positioned within said slot for removably receiving digital media into said adapter instead of directly into said slot and guide structure of said digital media reader, comprising:

(a) a generally rectangular header having an elongate top and bottom, opposite first and second elongate faces and opposite sides, said first face defining a plurality of electrical connector female apertures arranged in a configuration corresponding to the configuration of the male connector pins of said digital media reader for receiving the reader male connector pins in electrical contact therewithin, said second face having a plurality of male connector pins projecting therefrom in the same configuration as the reader male connector pins for electrical connection with said plurality of corresponding female connectors on said digital media;

(b) guide means corresponding to the guide structure of said reader defining the sides of said header, said guide means slidably engaging the guide structure of said reader for assuring proper sliding fit of said adapter within said guide structure and proper registry of said reader's male connector pins with said header's female apertures; and (c) means on said header for contacting structure on said reader for discharging electrostatic charge when said adapter is inserted into said reader;

said adapter being positioned behind said front panel of said reader when fully inserted into said slot.

2. An adapter, as claimed in claim 1, wherein said means on said header for discharging electrostatic charge comprises a metal plate extending from the bottom of said header toward and forward of said male connector pins on said header.

3. An adapter, as claimed in claim 2, wherein said metal plate includes an aperture therein adjacent its forward end.

4. An adapter, as claimed in claim 3, including a downward chamfer on its forward end.

5. An adapter, as claimed in claim 2, wherein said forward end of said metal plate is positioned immediately adjacent and rearward of said front panel of said reader when said adapter is fully inserted through said slot into said guide structure of said reader.

6. An adapter, as claimed in claim 5 wherein said metal plate includes a downward chamfer on its forward end and said chamfer is immediately adjacent and rearward of said front panel of said reader when said adapter is fully inserted through said slot into said guide structure of said reader.

7. An adapter, as claimed in claim 5 wherein said metal plate includes an aperture therein adjacent its forward end, whereby an adapter removal tool can be inserted through said slot into releasable engagement with said aperture for lifting said adapter above the bottom lip of said slot and extracting said adapter through said slot.

8. An adapter, as claimed in claim 1, wherein said header is formed of a first generally rectangular part comprising said first face, including said female apertures, and a second part generally rectangular part, including said second face and said male connector pins, said first and second parts each having a series of corresponding pins on the faces thereof opposite said female apertures and said male connector pins, respectively, said corresponding pins being electrically connected.

9. An adapter, as claimed in claim 8, wherein said corresponding pins on the faces of said first and second parts are soldered to each other.

10. An adapter, as claimed in claim 8, wherein said corresponding pins on the faces of said first and second parts are electrically connected by soldering each series of corresponding pins to a soldering adapter positioned between said first and second parts.

11. An adapter, as claimed in claim 8, wherein each of said first and second parts include ribs and grooves along its sides extending between its faces, said ribs and grooves on said first and second parts being in alignment and slidably engaging corresponding ribs and grooves on the guide structure of said reader.

12. An adapter, as claimed in claim 1, wherein said header includes ribs and grooves along its sides extending between its first and second faces, said ribs and grooves slidably engaging corresponding ribs and grooves on the guide structure of said reader.

\* \* \* \* \*